Jan. 7, 1941.   G. W. LESCHER ET AL   2,228,060
CONNECTING DEVICE
Filed May 23, 1938
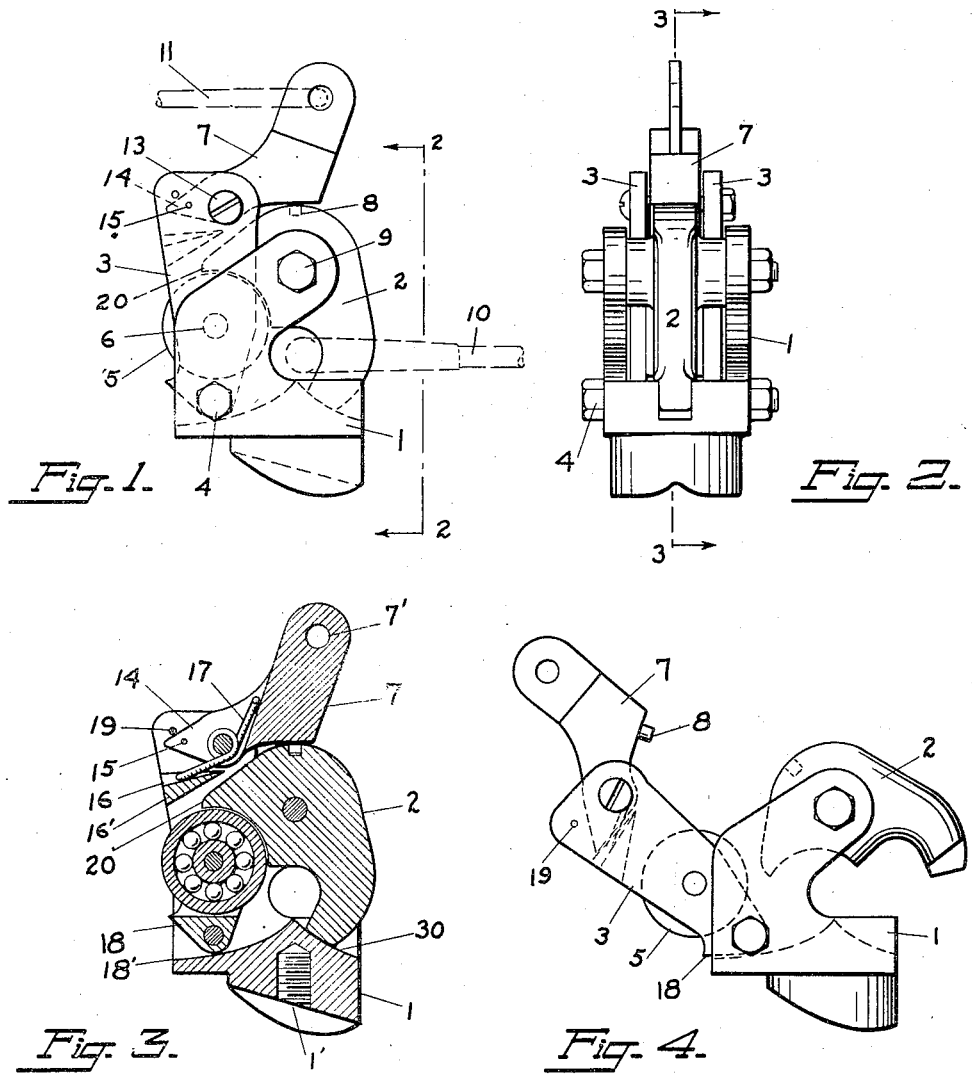
INVENTORS:
G.W. Lescher & W.H. Steet;
BY
Robert C Rasche
ATTORNEY.

Patented Jan. 7, 1941

2,228,060

UNITED STATES PATENT OFFICE 2,228,060

CONNECTING DEVICE

George W. Lescher, Garden City, and Walter H. Steet, East Farmingdale, Long Island, N. Y., assignors to Seversky Aircraft Corporation, a corporation of Delaware Application May 28, 1938, Serial No. 210,640

3 Claims. (Cl. 294—83)

This invention relates to connecting devices, and more particularly to devices of this kind for connecting a member to another for quick release of the first from the second.

The chief object of the invention is to provide a quick-release mechanism which will be adapted to hold the connected member to the base under quite a high load thereon, yet which will be quickly operable on occasion, while still highly loaded, to release the connected member.

A further object of the invention is to provide a device of this kind which will none-the-less require but small effort by the operator to operate it, and require practically a uniform effort regardless of the load, yet which will be positive in action and incapable of jamming in use.

A particular object of the invention is to provide a quick-release mechanism of this improved nature which will, notwithstanding, be simple in structure, light and compact and well adapted for quantity-production, yet rugged and durable in service withal.

The invention is particularly well-adapted for use as a release of a member under load, such as a spin-restraining parachute, or "spin-chute," from the member to which it is connected, such as an airplane. Such release mechanisms heretofore have involved the direct employment of direct load-carrying detents such as pins or latches working past a lug or stop, with the consequence that the friction and effort to overcome the load were always great, and the greater the load the greater the friction. The wear and abrasion on the moving parts were also high and the device soon became inoperative as a consequence. In the present invention, sliding friction is obviated and consequently the effort to operate it is rendered small and the frictional wear and abrasion are rendered negligible.

The other objects and advantages of the invention will be made manifest as this disclosure progresses.

The presently-preferred embodiment of the invention is, by way of exemplification only, described hereinafter and shown in the accompanying drawing, but the inventive-concepts are limited in their embodiments only by the scope of the sub-joined claims. In the drawing, Fig. 1 is a side elevation of the releasable connecting-device;

Fig. 2 is an elevation taken at right angles thereto;

Fig. 3 is a section along line 3—3 of Fig. 2, and

Fig. 4 is a side elevation of the connection-device opened after releasing the member it had been connecting to the other.

The device shown in the drawing comprises a frame or bracket 1, best seen in Fig. 4, and here shown as an integral casting with two parallel jaws as shown and bearing a threaded bolt-seat 1' for attachment to a base. Pivoted between the upper portions of the jaws on a bolt 9 is a recurved member or bellcrank, 2, having a kerfed-out upper end 20. An arm-unit 3 comprising two parallel united plates is also pivoted between the jaws of the bracket by means of a bolt 4. The arm 3 carries a ball-bearing roller unit 5 mounted on a pin 6. In the closed position of the device, the formation 20 fits over the periphery of the ball-bearing and seats thereon.

A trigger-member 7 is mounted on the upper end of arm-unit 3 by means of a bolt 13, and the lower face of the trigger bears a formation or seat 8 for engaging a complementary aperture in the upper periphery of the finger 2. A single-turn spring 17, mounted on the bolt 13, urges the trigger into engagement with the finger. A stop-pin 19 is provided to extend between the jaws to limit the upward motion of the trigger when same undergoes its engaging operation. The trigger-member is also provided with parallel extensions or ears 14, and the arm-unit 3 is provided with a web 16 which limits the downward motion of the trigger. The movement of the trigger is thus restricted to a definite arc.

A safety-device in the form of a shearable-pin 15 extends between the sides of the arm 3 and through the extension 14. It is made of soft wire which is sufficiently strong to prevent accidental opening of the device, yet sufficiently weak to permit its shearing as soon as the normal operating forces are applied to the trigger.

Each of the arms 3 bears a projection or lip 18, and the lower portion of the bracket 1 bears an abutment 18' for same, and an abutment 30 for the lower end of the finger 2.

The trigger 7, bears an aperture 7' for a lanyard 11 which leads to a remote point where the operator is located. The load to be carried when the device is closed and locked is hung on the outer end of the member 10, and instead of bearing directly on some part or other of the connecting device, as is the usual practice, this force is transmitted through the peculiarly shaped and mounted finger 2 to the kerf 20. The kerf transmits the load in a tangential direction only, to the roller-member 5.

When the lanyard 11 is pulled to the left in Fig. 1, employing but a slight force, the shear-wire is first sheared through, followed by the easy withdrawal of the member 8 from the finger 2. The trigger and arm 3 are then free to pivot together around the bolt 4, the ball-bearing thereupon commencing rolling out, substantially frictionlessly, from under the lip of the kerf 20. When the lip is slightly past the dead-center of the ball-bearing, the arm-unit 3, due to the load on the catch 2, will be suddenly snapped outwardly, leaving the catch 2 free to be pulled around on the bolt 9 a sufficient amount to allow the loop of the member 10 to slip past the lower end of the finger and out of the connector.

The backward-snapping of the arm-unit 3 is, as shown in Fig. 4, limited by the engagement of the lips 18 and abutment 18'. The finger 2 rotates in small compass, and hence all the parts are in convenient position for ready engagement to hold and release another load.

It is to be understood that the connector-releaser is adapted to function in the holding and release of various kinds of members and of loads of almost any degree without requiring modifications going beyond the scope of the sub-joined claims.

What we claim as our property and desire to secure by Letters Patent of the United States is:

1. A releasing device comprising a frame adapted to be affixed to a support and including a pair of parallel, laterally-spaced jaws, a bell-crank pivoted between and located adjacent the free outer ends of the jaws, one end of said bell-crank being adapted to seat against the frame and close the open sides of the jaws, an arm pivoted between the jaws, a roller mounted upon said arm and circumferentially engageable by the other end of said bell-crank, a trigger pivoted upon the arm, a detent for releasably locking the trigger to the bell-crank, and means for yieldingly maintaining the detent in operative locked position with the bell-crank closing the open sides of the jaws, said trigger being arranged to be swung about its pivot to release the detent and allow the bell-crank to freely rock to open position with respect to the jaws and said arm being arranged to swing about its pivot to withdraw the roller for engagement with the bell-crank.

2. A releasing device comprising a frame adapted to be affixed to a support and including a pair of parallel, laterally-spaced jaws, a bell-crank pivoted between and located adjacent the free outer ends of the jaws, one end of said bell-crank being adapted to seat against the frame and close the open sides of the jaws, said bell-crank being so weighted as to tend to rotate to open position with respect to the jaws, an arm pivoted between the jaws, a roller mounted upon said arm and circumferentially engageable by the other end of said bell-crank, a trigger pivoted upon the arm, a detent for releasably locking the trigger to the bell-crank, and means for yieldingly maintaining the detent in operative locked position with the bell-crank closing the open sides of the jaws, said trigger being arranged to be swung about its pivot to release the detent and allow the bell-crank to freely rock to open position with respect to the jaws and said arm being arranged to swing about its pivot to withdraw the roller from engagement with the bell-crank.

3. A releasing device comprising a frame adapted to be affixed to a support and including a pair of parallel, laterally-spaced jaws, a bell-crank pivoted between and located adjacent the free outer ends of the jaws, one end of said bell-crank being adapted to seat against the frame and close the open sides of the jaws, an arm pivoted between the jaws, a roller mounted upon said arm and circumferentially engageable by the other end of said bell-crank, a trigger pivoted upon the arm, a detent for releasably locking the trigger to the bell-crank, means for yieldingly maintaining the detent in operative locked position with the bell-crank closing the open sides of the jaws, said trigger being arranged to be swung about its pivot to release the detent and allow the bell-crank to freely rock to open position with respect to the jaws and said arm being arranged to swing about its pivot to withdraw the roller from engagement with the bell-crank, and a frangible pin temporarily securing the trigger in locked position with respect to the bell-crank but adapted to shear and release said trigger in response to a jerk upon said trigger.

GEORGE W. LESCHER.
WALTER H. STEET.